US009258451B2

(12) United States Patent
Nameki

(10) Patent No.: US 9,258,451 B2
(45) Date of Patent: Feb. 9, 2016

(54) INFORMATION TRANSMITTING APPARATUS, INFORMATION TRANSMITTING METHOD, AND NON-TRANSITORY COMPUTER READABLE MEDIUM

(71) Applicant: FUJI XEROX CO., LTD., Minato-ku, Tokyo (JP)

(72) Inventor: Yu Nameki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/120,264

(22) Filed: May 14, 2014

(65) Prior Publication Data

US 2015/0049367 A1   Feb. 19, 2015

(30) Foreign Application Priority Data

Aug. 14, 2013  (JP) .................................. 2013-168699

(51) Int. Cl.
H04N 1/32         (2006.01)

(52) U.S. Cl.
CPC ................................. H04N 1/32117 (2013.01)

(58) Field of Classification Search
CPC .......... H04N 1/00214; H04N 1/33369; H04N 2201/3214; H04N 2201/3215; H04N 2201/3274; H04N 2201/3278; H04N 2201/0017; H04N 2201/3202; H04N 1/2166
USPC ..................... 358/1.9, 1.16, 404, 405; 399/81; 707/721
See application file for complete search history.

(56) References Cited

U.S. PATENT DOCUMENTS

| 2003/0187958 A1* | 10/2003 | Aoki ................. G06F 17/30884 709/219 |
| 2006/0190496 A1* | 8/2006 | Tsunoda ....................... 707/200 |
| 2009/0091776 A1* | 4/2009 | Kobayashi et al. .......... 358/1.13 |

FOREIGN PATENT DOCUMENTS

JP        2006-229869 A      8/2006

\* cited by examiner

*Primary Examiner* — Jamares Q Washington
(74) *Attorney, Agent, or Firm* — Sughrue Mion, PLLC

(57) ABSTRACT

An information transmitting apparatus includes a recipient information memory storing multiple pieces of recipient information and recipient identification information that is associated with each of the multiple pieces of recipient information and is used for identifying each piece of recipient information; a user information memory storing user selection identification information, which is the recipient identification information selected by a user from the recipient information memory, and storing information indicating a time when the user selection identification information is selected by the user; an information transmitting unit reading out the recipient information corresponding to the user selection identification information from the recipient information memory to transmit information to the recipient identified by the recipient information that is read out; and a notification unit notifying the user of change if the recipient information stored in the recipient information memory is changed after the selection.

7 Claims, 6 Drawing Sheets

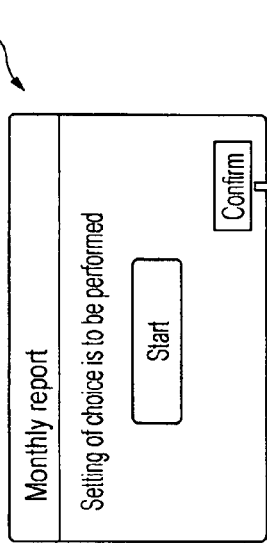
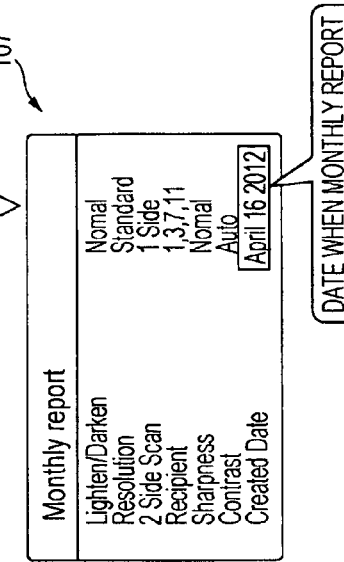
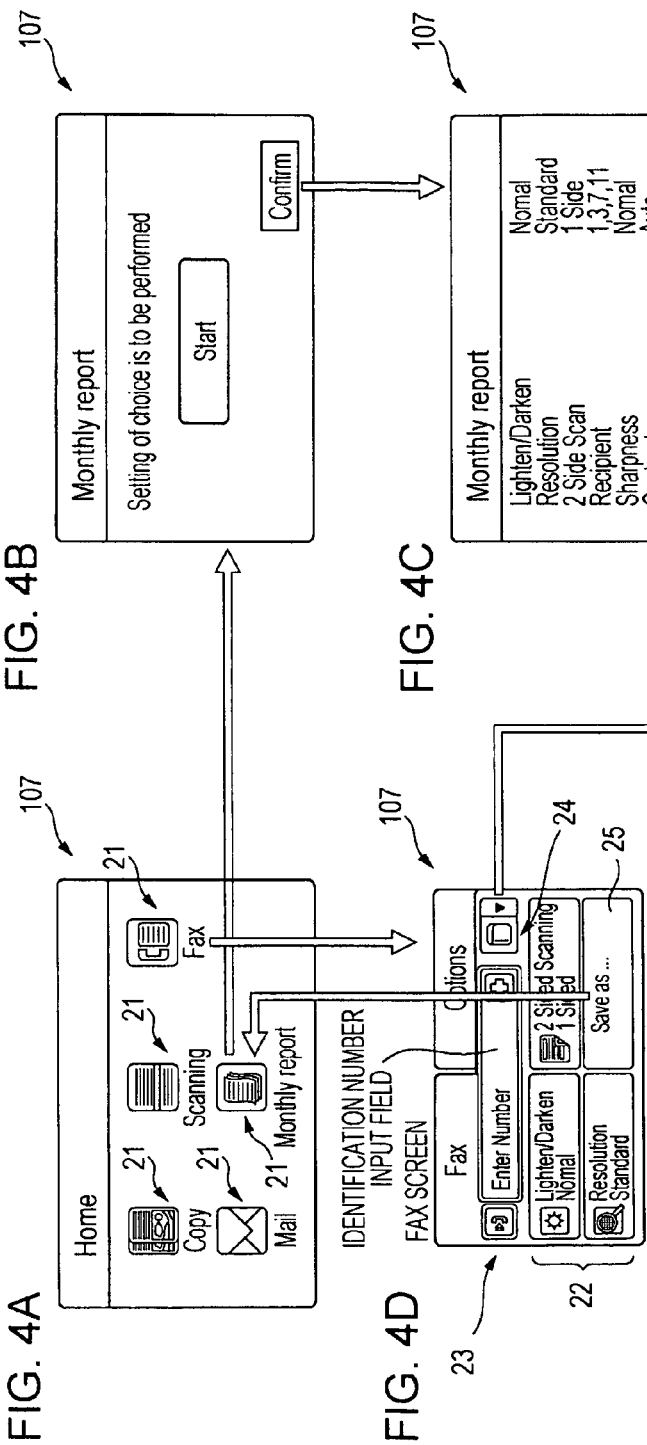
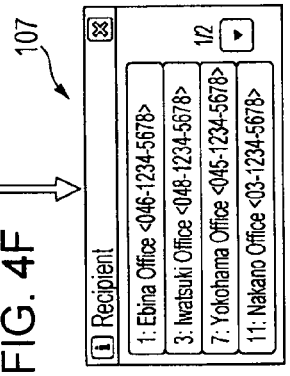
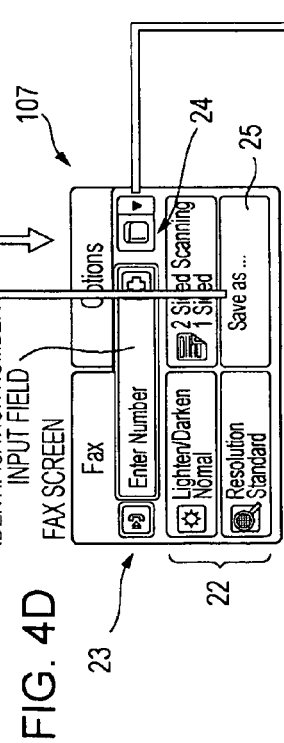

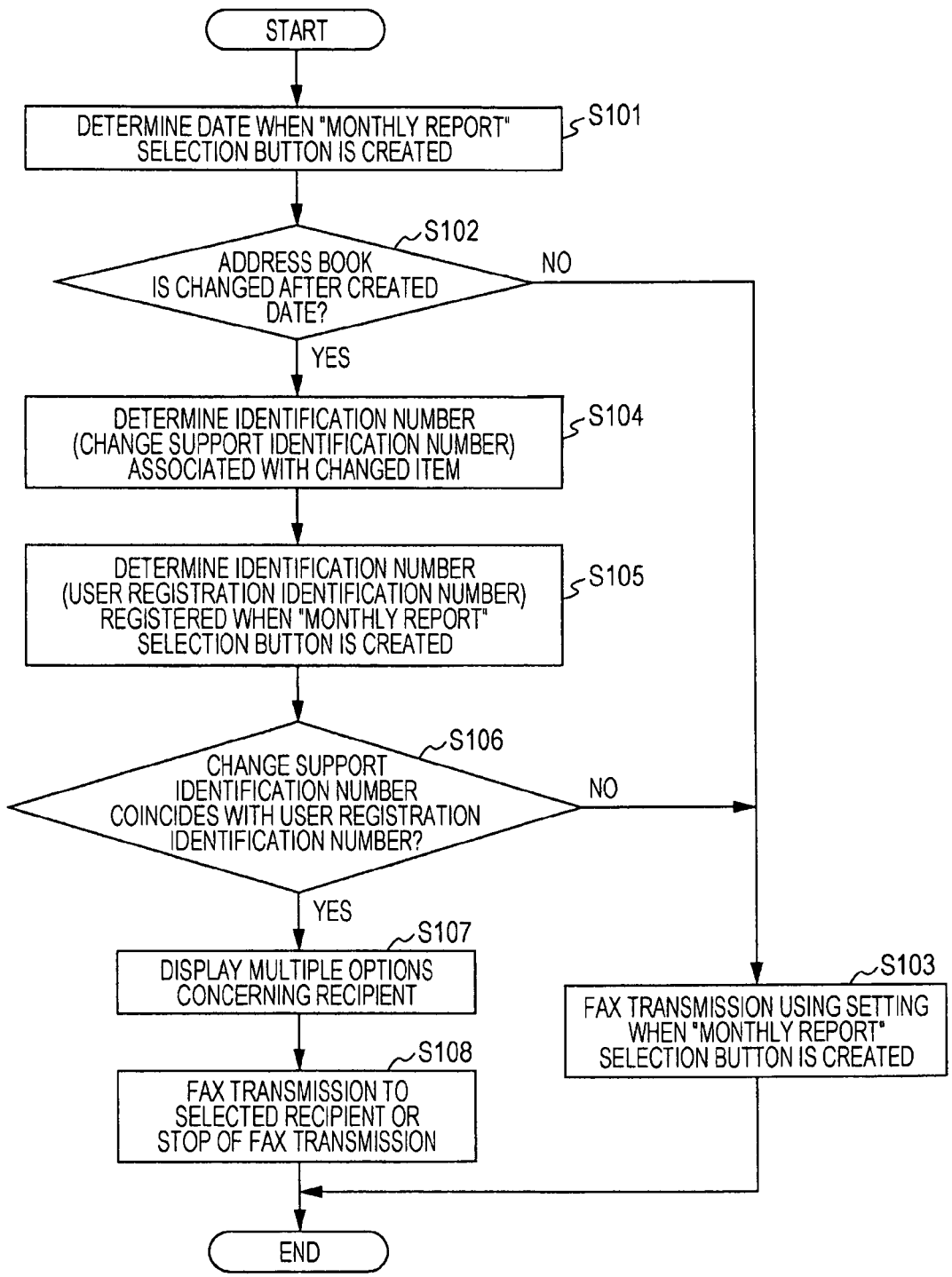

INFORMATION TRANSMITTING APPARATUS, INFORMATION TRANSMITTING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-168699 filed Aug. 14, 2013.

BACKGROUND

Technical Field

The present invention relates to an information transmitting apparatus, an information transmitting method, and a non-transitory computer readable medium.

SUMMARY

According to an aspect of the invention, there is provided an information transmitting apparatus including a recipient information memory, a user information memory, an information transmitting unit, and a notification unit. The recipient information memory stores multiple pieces of recipient information concerning recipients of information and recipient identification information that is associated with each of the multiple pieces of recipient information and that is used for identifying each piece of recipient information. The user information memory stores user selection identification information, which is the recipient identification information selected by a user from the recipient identification information stored in the recipient information memory, and stores information indicating a time when the user selection identification information is selected by the user. The information transmitting unit reads out the recipient information corresponding to the user selection identification information stored in the user information memory from the recipient information memory to transmit information to the recipient identified by the recipient information that is read out. The notification unit notifies the user of change if the recipient information stored in the recipient information memory is changed after the selection.

BRIEF DESCRIPTION OF THE DRAWINGS

Exemplary embodiments of the present invention will be described in detail based on the following figures, wherein:

FIGS. 4A to 4F illustrate examples of display in the display unit;

FIGS. 5A and 5B are diagrams for describing a change history of an address book and so on; and FIG. 6 is a flowchart illustrating an exemplary process executed in the facsimile transmission of a monthly report in detail.

DETAILED DESCRIPTION

Exemplary embodiments of the present invention will herein be described in detail with reference to the attached drawings.

Figure 1:
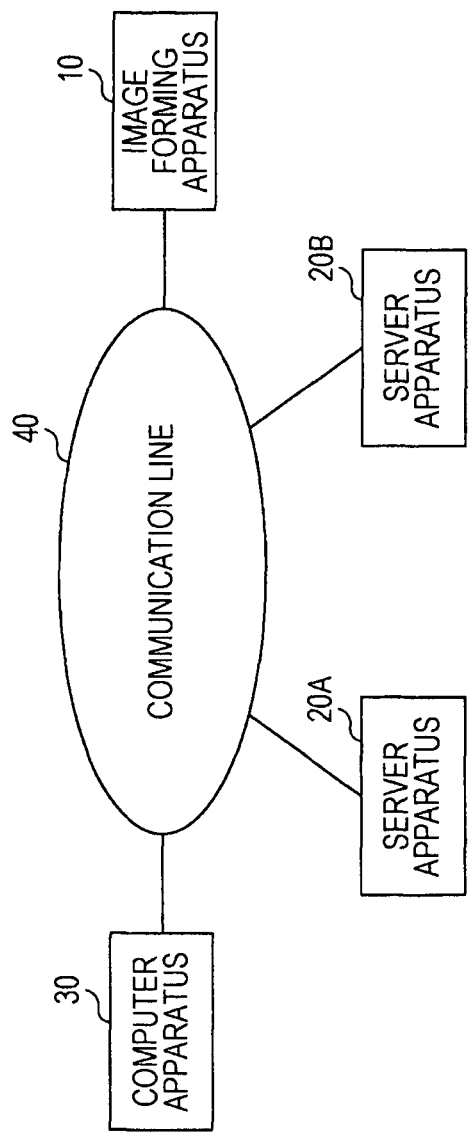
FIG. 1 illustrates an example of the entire configuration of an exemplary embodiment of the present invention.

FIG. 1 illustrates an example of the entire configuration of an exemplary embodiment of the present invention, which includes an image forming apparatus 10, a server apparatus 20A, a server apparatus 20B, a computer apparatus 30, and a communication line 40. Referring to FIG. 1, the image processing apparatus 10 has a function to copy a document, a function to read out a document to generate image data about the document that is read out, and a function to form an image represented by the image data on a sheet of paper. The server apparatuses 20A and 20B each receive a request from an apparatus, which serves as a client, to provide a service. The above apparatuses are connected to the communication line 40 that connects the apparatuses so as to enable communication and are capable of communicating with each other via the communication line 40. Although one image forming apparatus 10, one computer apparatus 30, and two server apparatuses are illustrated in FIG. 1, two or more image forming apparatuses, two or more computer apparatuses, and three or more server apparatuses may be connected to the communication line 40.

Figure 2:
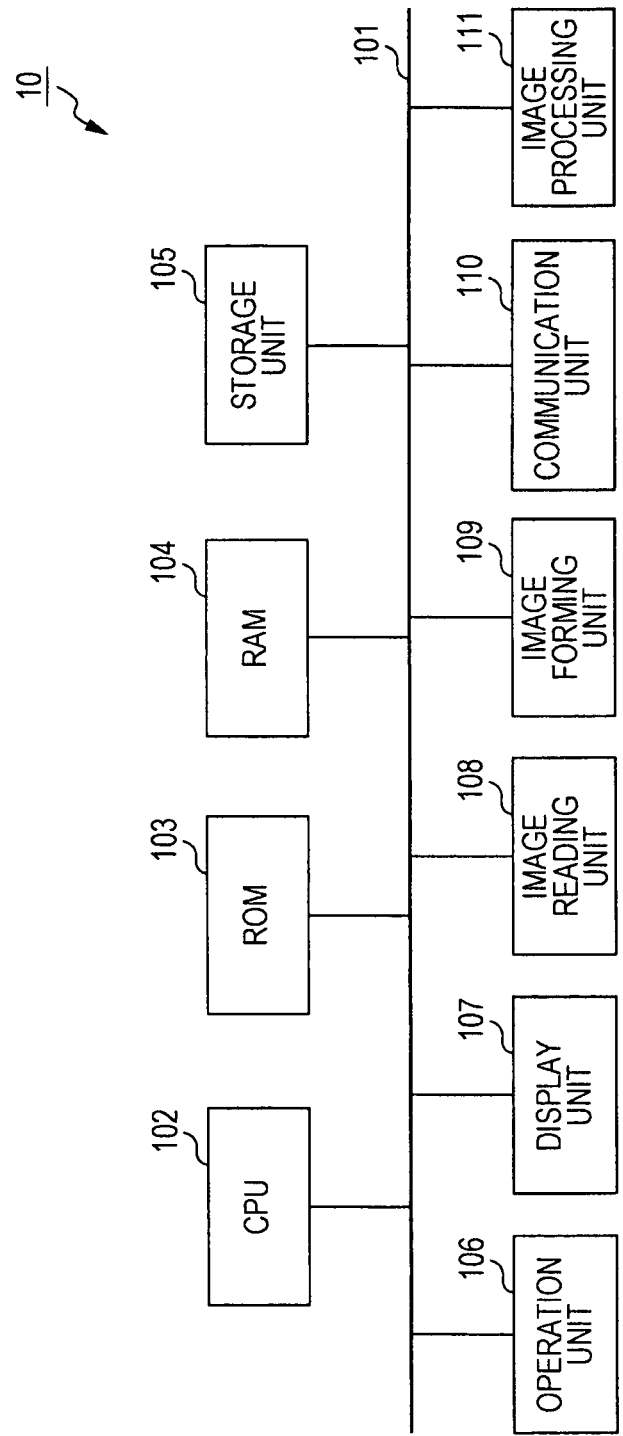
FIG. 2 is a block diagram illustrating an example of the hardware configuration of an image forming apparatus according to the present exemplary embodiment.

FIG. 2 is a block diagram illustrating an example of the hardware configuration of the image forming apparatus 10 according to the present exemplary embodiment. Referring to FIG. 2, the image forming apparatus 10 includes a central processing unit (CPU) 102, a read only memory (ROM) 103, a random access memory (RAM) 104, a storage unit 105, an operation unit 106, a display unit 107, an image reading unit 108, an image forming unit 109, a communication unit 110, and an image processing unit 111. The components in the image forming apparatus 10 are connected to a bus 101 and exchange a variety of data with each other via the bus 101.

The operation unit 106 includes multiple operation devices that accept user's operations. The operation device may be a hardware key. The operation device may be a touch panel that is displayed in the display unit 107 and that outputs a control signal corresponding to the position where a user presses.

The display unit 107 is, for example, a display device including a liquid crystal display. The display unit 107 displays, for example, a menu screen used to operate the image forming apparatus 10 and data concerning the image forming apparatus 10 under the control of the CPU 102.

The image reading unit 108 includes an image reading device that reads out a document to generate image data representing an image of the document that is read out. The image reading unit 108 supplies the generated image data to the image processing unit 111.

The image forming unit 109 includes an image forming mechanism that electrophotographically forms a toner image corresponding to the image data on a recording medium, such as a sheet of paper.

The communication unit 110 is connected to the communication line 40 and functions as a communication interface that communicates with another unit connected to the communication line 40.

The image processing unit 111 performs image processing, such as color correction or tone correction, to the image represented by the image data that is input. The image processing unit 111 generates the image data subjected to the image processing to supply the generated image data to the image forming unit 109.

The storage unit 105 includes a storage device and stores, for example, data received through the communication unit 110 and data generated in the image forming apparatus 10.

The ROM 103 stores a control program executed by the CPU 102. The CPU 102 reads out the control program stored in the ROM 103 to execute the control program using the RAM 104 as a working area. Upon execution of the control program by the CPU 102, each component in the image forming apparatus 10 is controlled by the CPU 102. The image forming apparatus 10 is capable of, for example, generating an image on a sheet of paper to output the image, reading out a document to generate image data about the document, and communicating with another apparatus via the communication line.

The program executed by the CPU 102 may be provided in a state in which the program is stored in a computer-readable recording medium, such as a magnetic recording medium (a magnetic tape, a magnetic disk, etc.), an optical recording medium (an optical disk, etc.), a magneto-optical recording medium, or a semiconductor memory. The image forming apparatus 10 may download the program using a communication device, such as the Internet.

Figure 3:
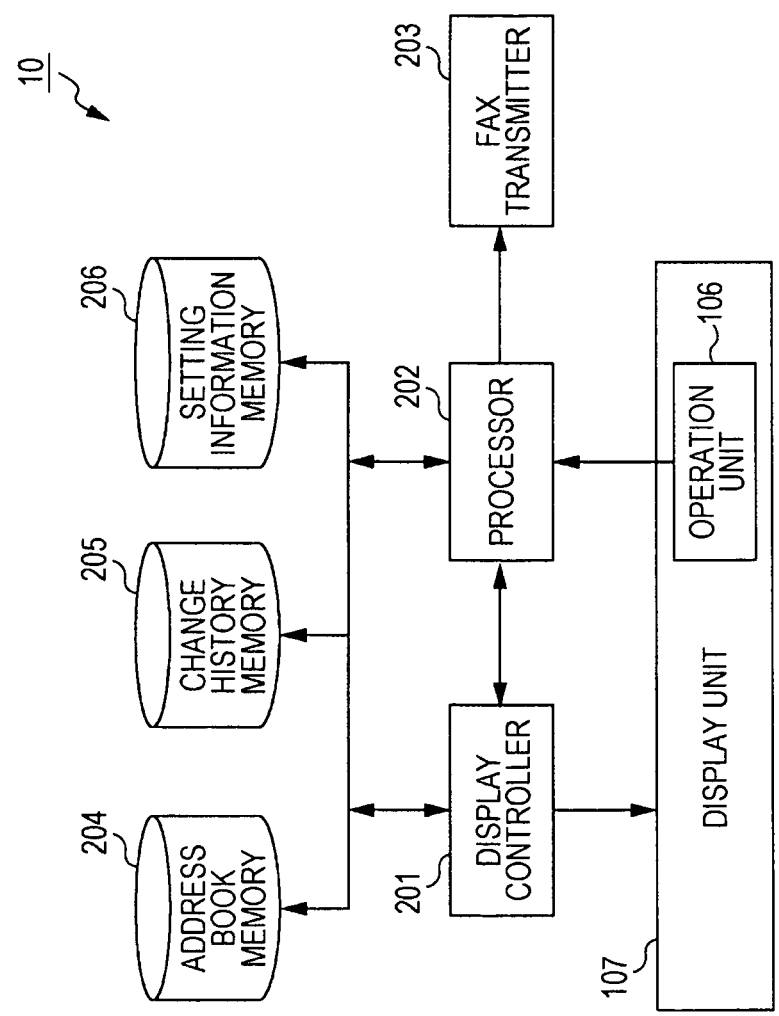
FIG. 3 is a functional block diagram concerning display control and facsimile transmission in a display unit.

FIG. 3 is a functional block diagram concerning display control and facsimile transmission in the display unit 107.

A display controller 201 that controls display in the display unit 107 is provided in the present exemplary embodiment. In addition, a processor 202 that accepts data from the operation unit 106 and performs predetermined processing is also provided. The operation unit 106 is composed of the touch panel provided in the display unit 107 in the present exemplary embodiment. Furthermore, a FAX transmitter 203 that controls the image reading unit 108 (refer to FIG. 2) and the communication unit 110 to execute the facsimile transmission is provided in the present exemplary embodiment.

Furthermore, an address book memory 204, a change history memory 205, and a setting information memory 206 are provided in the present exemplary embodiment. The address book memory 204 stores an address book in which, for example, recipient names used in the facsimile transmission are recorded. The change history memory 205 stores information concerning change each time the content of the address book is changed. The setting information memory 206 stores a variety of setting information used in the facsimile transmission and so on.

The respective functional components illustrated in FIG. 3 are realized by cooperation of software and hardware. Specifically, an operating system (OS), application software that executes a specific function of each component in cooperation with the OS, and so on are stored in the ROM 103 (refer to FIG. 2) and the storage unit 105.

The CPU 102 (refer to FIG. 2) reads out the program from, for example, the ROM 103 into the RAM 104, which is a main memory, and executes the program to realize the functional components: the display controller 201, the processor 202, and the FAX transmitter 203. The address book memory 204, the change history memory 205, and the setting information memory 206 are realized by the storage unit 105 (refer to FIG. 2).

Although the content concerning the facsimile transmission is described below in the present exemplary embodiment, the processing described in the present exemplary embodiment is applicable to data transmission using an electronic mail or the like from the image forming apparatus 10 to an external apparatus.

FIGS. 4A to 4F illustrate examples of display in the display unit 107.

A Home screen illustrated in FIG. 4A is normally displayed in the display unit 107 in the present exemplary embodiment. Multiple selection buttons (icons) 21 are displayed on the Home screen. Upon selection (pressing) of any of the selection buttons 21 by the user, the function associated with the selection button 21 is executed.

Specifically, the selection buttons 21 used to select "Copy", "Scanning", "FAX", "Mail", and "Monthly report" are displayed in the example illustrated in FIG. 4A. Upon selection of any of the selection buttons 21 by the user, the function (for example, the copy function) associated with the selected button is executed. When the "Monthly report" is selected by the user, document data is transmitted to a destination that is registered in advance by facsimile.

An exemplary process when the "Monthly report" selection button 21 is selected will now be described in detail.

Upon selection of the "Monthly report" selection button 21 by the user, the display on the displayed screen is switched to a screen (hereinafter referred to as a "monthly report screen") illustrated in FIG. 4B.

Upon selection (pressing) of a "Start" button displayed on the monthly report screen by the user, the facsimile transmission to a predetermined destination is executed by the FAX transmitter 203 illustrated in FIG. 3. Specifically, a document (a monthly report) set in the image reading unit 108 (refer to FIG. 2) is read out to generate image data and the image data is transmitted to an external apparatus (the recipient that is registered in advance) via the communication unit 110.

A confirmation button (displayed as "Confirm" in FIG. 4B) is displayed in a lower right portion of the monthly report screen. Upon pressing of the confirmation button by the user, the display on the displayed screen is switched to a screen (hereinafter referred to as a "setting confirmation screen") illustrated in FIG. 4C.

The setting information that is set by the user in advance is displayed on the setting confirmation screen. Specifically, a reading condition when the document is read out and information about the recipient of the facsimile transmission are displayed. The date (Created Date) when the "Monthly report" selection button 21 is created by the user is also displayed.

The user is capable of creating the selection button 21 in the present exemplary embodiment, and the "Monthly report" selection button 21 is the selection button 21 created by the user. When the user is capable of creating the selection button 21, the user is capable of registering desired settings and so on in advance. In this case, it is not necessary for the user to make the setting each time the facsimile transmission or the copying is executed to simplify the operation by the user.

An exemplary operation by the user who creates the "Monthly report" selection button 21 will now be described.

In the creation of the "Monthly report" selection button 21, upon pressing of the "FAX" selection button 21 in FIG. 4A by the user, the display on the displayed screen is switched to a screen (hereinafter referred to as a "FAX screen") illustrated in FIG. 4D.

Multiple setting buttons 22 used to set conditions including the document reading condition are displayed at the bottom side on the FAX screen in FIG. 4D. Upon operation of any of the setting buttons 22 by the user, the corresponding condition, for example, when the document is read out is set. A list display button 23 used to display a list of the recipients is provided in an upper left portion on the displayed screen in FIG. 4D.

Upon pressing of the list display button 23 by the user, the display on the displayed screen is switched to a screen (hereinafter referred to as a "recipient list screen") illustrated in FIG. 4E. Multiple pieces of recipient information and an identification number (index) used for identifying each recipient are displayed on the recipient list screen. The identification number (index) is an example of recipient identification information. In the present exemplary embodiment, the address book in which, for example, the identification numbers, user names, telephone numbers, and mail addresses are recorded in association with each other is stored in the address book memory 204 (refer to FIG. 3), which is an example of a recipient information memory. Upon pressing of the list display button 23 by the user, the content of the address book is displayed.

As illustrated in FIG. 4D, an identification number input field is provided in an upper central portion on the FAX screen. In the present exemplary embodiment, the identification number of a partner with whom the transmission is to be performed is input in the identification number input field. The identification number is stored (registered) in the setting information memory 206 (refer to FIG. 3) as user selection identification information.

In addition, in the present exemplary embodiment, a confirmation button 24 is provided in an upper right portion on the displayed screen, as illustrated in FIG. 4D. Upon pressing of the confirmation button 24 by the user, the display on the displayed screen is switched to a screen illustrated in FIG. 4F. The registered identification numbers and the recipients (names and FAX numbers) associated with the identification numbers are displayed on the screen in FIG. 4F.

In the present exemplary embodiment, the identification numbers are registered, instead of the direct registration of the information about the recipients (for example, the names and the FAX numbers), in the creation of the "Monthly report" selection button 21. Accordingly, the amount of use of the memory is reduced, compared with the case in which the information about the recipients is directly registered.

Upon completion of the setting of the conditions including the document reading condition, the registration of the destinations (the identification numbers), and so on, the user presses a "Save as" button 25 illustrated in FIG. 4D, although not described above. Upon pressing of the Save as button 25 by the user, the "Monthly report" selection button 21 is created on the Home screen illustrated in FIG. 4A and the information about the set conditions and the destinations (the identification numbers) is stored in the setting information memory 206, which functions as a user information memory. The date (Created Date) when the "Monthly report" selection button 21 is created by the user (the date when the recipient is selected by the user) is also stored in the setting information memory 206.

The identification numbers are stored in the setting information memory 206 as the information about the destinations, instead of the recipients (for example, the names and the FAX numbers), as described above. Accordingly, the amount of use of the memory (the setting information memory 206) is reduced, compared with the case in which the recipients are stored.

An exemplary basic operation when the "Monthly report" selection button 21 is selected by the user to practically execute the facsimile transmission will now be described.

When the "Monthly report" selection button 21 is selected by the user to execute the facsimile transmission, the "Monthly report" selection button 21 in FIG. 4A is selected by the user and, then, the "Start" button in FIG. 4B is pressed by the user. Upon selection of the "Monthly report" selection button 21 and pressing of the "Start" button by the user, the FAX transmitter 203, which functions as an information transmitting unit, reads out the condition (for example, the document reading condition) stored in the setting information memory 206 from the setting information memory 206 to read out an image of the document (the monthly report) on the basis of the condition that is read out.

The FAX transmitter 203 reads out the identification number from the setting information memory 206. Then, the FAX transmitter 203 refers to the address book stored in the address book memory 204 to read out the facsimile number associated with the identification number. Then, the FAX transmitter 203 transmits the facsimile (the monthly report) to each recipient using the facsimile number.

The address book stored in the address book memory 204 is shared between multiple users and the content of the address book may be changed by a user different from the user who has created the "Monthly report" selection button 21. In such a case, the monthly report may be transmitted to a wrong recipient. Since the monthly report is transmitted on the basis of the recipient registered in the address book, the facsimile may be transmitted to a recipient different from the correct recipient if the content of the address book is changed.

Figures 5A, 5B:
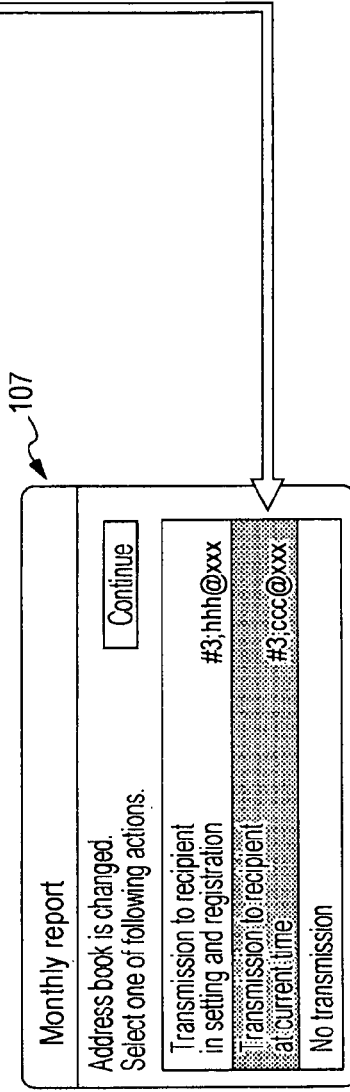

In order to suppress an occurrence of the above problem, in the present exemplary embodiment, a change history of the address book illustrated in FIG. 5A (for describing the change history of the address book and so on) is stored in the change history memory 205, which functions as a change information memory. Specifically, the date when the address book is changed, the identification number, an old recipient (when the name of the recipient is changed), an old telephone number (when the telephone number of the recipient is changed), an old electronic mail address (the mail address of the recipient is changed), the reason why the change is performed (refer to "Reason for estimation" in FIG. 5A), and the content of processing (Action) are stored in association with each other in the change history of the address book.

An exemplary process in the facsimile transmission of the monthly report will now be described in detail.

FIG. 6 is a flowchart illustrating the exemplary process executed in the facsimile transmission of the monthly report in detail.

In the facsimile transmission of the monthly report, the "Monthly report" selection button 21 illustrated in FIG. 4A is selected by the user and the "Start" button illustrated in FIG. 4B is pressed by the user, as described above. Referring to FIG. 6, in Step S101, the processor 202 (refer to FIG. 3) refers to the setting information memory 206 (refer to FIG. 3) to determine the created date when the "Monthly report" selection button 21 is created by the user (refer to "Created Date" described in the bottom row in FIG. 4C) (hereinafter referred to as a "button created date").

In Step S102, the processor 202 refers to the change history (refer to FIG. 5A) stored in the change history memory 205 to determine whether the address book is changed (updated) after the button created date determined in Step S101. The change history of the address book is checked from the most recent date to the button created date to determine whether the address book is changed after the button created date in Step S102.

If the processor 202 determines that the address book is not changed after the button created date (NO in Step S102), in Step S103, the basic operation described above is performed to execute the facsimile transmission using the address book without change. Specifically, the identification number stored in the setting information memory 206 is read out and the facsimile number associated with the identification number is read out by referring to the address book stored in the address book memory 204. Then, the facsimile (the monthly report) is transmitted to each recipient using the facsimile number.

If the processor 202 determines that the address book is changed after the button created date (YES in Step S102), in Step S104, the processor 202 determines the item that is changed in the address book and determines the identification number associated with the changed item (this identification number is hereinafter referred to as a "change support identification number").

In Step S105, the processor 202 determines the identification number that is registered (set) by the user when the "Monthly report" selection button 21 is created (this identification number is hereinafter referred to as a "user registration identification number) with reference to the setting information memory 206. In Step S106, the processor 202 compares the change support identification number determined in Step S104 with the user registration identification number determined in Step S105 to determine whether the change support identification number coincides with the user registration identification number.

If the processor 202 determines that the change support identification number does not coincide with the user registration identification number, that is, if the change of the address book is not practically performed for the "monthly report" (NO in Step S106), the process goes to Step S103 to execute the facsimile transmission using the address book without change.

If the processor 202 determines that the change support identification number coincides with the user registration identification number (YES in Step S106), the display controller 201, which functions as a notification unit, notifies the user of the change of the address book. Specifically, for example, a message "Address book is changed." is displayed, as illustrated in FIG. 5B.

In Step S107, the display controller 201 displays a screen including multiple options. Then, the processing corresponding to the option selected by the user is performed by, for example, the processor 202 in the present exemplary embodiment. Specifically, in Step S108, the facsimile transmission to the recipient selected by the user or stop of the facsimile transmission is performed.

In the change history illustrated in FIG. 5A, the user names and so on are changed in the identification numbers 3 to 5 after Apr. 16, 2012 when the "Monthly report" selection button is created. On the date when the "Monthly report" selection button 21 is created, the identification numbers 1, 3, 7, and 11 are registered as the recipients (refer to FIG. 4C and FIG. 4F) and the identification number 3 is included in the registered recipients.

In such a case, the processor 202 determines that the change support identification number coincides with the user registration identification number in Step S106. In this case, the display controller 201, which functions as an option display, displays the screen including the multiple options in Step S107. Specifically, a screen illustrated in FIG. 5B is displayed.

Three options: (1) Transmission to the recipient before the address book is changed (the recipient when the "Monthly report" selection button 21 is created (set and registered)), (2) Transmission to the recipient after the address book is changed (the recipient at the current time) (the most recent recipient), and (3) No transmission are displayed on the displayed screen illustrated in FIG. 5B. In the present exemplary embodiment, inquiries about whether the transmission is performed and which recipient the transmission is performed to if the transmission is performed are made to the user with the displayed screen.

For example, when (1) Transmission to the recipient before the address book is changed is selected by the user, the processor 202 sets the recipient before the address book is changed (the recipient registered when the "Monthly report" selection button 21 is created) as the recipient for the identification number 3.

For example, when (2) Transmission to the recipient after the address book is changed is selected by the user, the processor 202 sets the recipient after the address book is changed as the recipient for the identification number 3.

When (3) No transmission is selected by the user, the processor 202 excludes the recipient corresponding to the identification number 3 from the recipients. The facsimile transmission may be stopped when (3) No transmission is selected by the user.

The displayed screen illustrated in FIG. 5B is displayed in a state in which one option has already been selected in the present exemplary embodiment, although not described above. In the example in FIG. 5B, the displayed screen is displayed in a state in which the option (2) has already been selected.

If the content of processing performed on the basis of the option that has already been selected coincides with the content of processing which the user wants when the display is performed in the above manner, it is not necessary for the user to perform the selection operation. In this case, the user is capable of proceeding to the next operation only by pressing a continue button ("Continue" in FIG. 5B).

In the display with one option selected, the display controller 201 refer to "Reason for estimation illustrated in FIG. 5A to determine one option in which the display is performed with the one option selected on the basis of the reason for estimation.

The processor 202 estimates the reason for the change when the user changes the address book in the present exemplary embodiment. Specifically, the processor 202 estimates the reason for the change on the basis of the changed item when the user changes the address book. The one option in which the display is performed with the option selected is determined on the basis of the estimated reason in the present exemplary embodiment.

More specifically, if the changed item is only the user name (refer to the identification number 7 in FIG. 5A), the processor 202 estimates that the change is made because of, for example, change of the company name or marriage. If the changed item is only the telephone number (refer to the identification number 4 in FIG. 5A), the processor 202 estimates that the change is made because of transfer of the office.

If the changed item is only the electronic mail address (refer to the identification number 3 in FIG. 5A), the processor 202 estimates that the change is made because of change of the provider. If the changed items are, for example, the user name, the telephone number, and the electronic mail address (refer to the identification number 5 in FIG. 5A), the processor 202 estimates that the change is made because of movement or change of the person.

In the present exemplary embodiment, the display with the one option selected is performed on the basis of the estimated reason, as described above. When the reason for estimation is change of the company name or marriage (the identification number 7), the display is performed with (3) No transmission selected. When the reason for estimation is transfer of the office (the identification number 4), the display is performed with (2) Transmission to the recipient after the address book is changed selected.

Also when the reason for estimation is change of provider (the identification number 3), the display is performed with (2) Transmission to the recipient after the address book is changed selected. When the reason for estimation is movement or change of the person (the identification number 5), the display is performed with (3) No transmission selected.

Another exemplary process will now be described.

The process in the case in which the item associated with one identification number (the identification number 3), among the multiple identification numbers registered by the user, is changed by another user is exemplified above. Specifically, the mode in which, when the item associated with one identification number (the identification number 3) is changed by another user, the user is caused to select any of the transmission to the recipient before the change, the transmission to the recipient after the change, and no transmission and the processing selected by the user is performed is exemplified above.

However, when multiple items are changed by another user and the change is made for multiple identification numbers, it is difficult to make the inquiry in the above manner. Specifically, when the inquiry is to be performed in the above manner in the state in which the change is made for multiple identification numbers, it is necessary to make the inquiry about the above three items for every identification number and this is troublesome to the user. Accordingly, when the change is made for multiple identification numbers, the following three options (1) to (3) may be displayed in the display unit 107:

(1) All recipients included in the recipients before the address book is changed (the recipients when the "Monthly report" selection button 21 is created) are used as the recipients, (2) All recipients included in the recipients after the address book is changed (the recipients at the current time, that is, the most recent recipients) are used as the recipients, and (3) The recipient is confirmed for every identification number that is changed.

Although the identification number, the date when the address book is changed, and the content of change (the content of change about the user name, the telephone number, etc.) are stored in the change history of the address book in the above description, only two kinds of information: the identification number and the date when the address book is changed may be stored and the content of the change may not be stored.

In this case, the date when the address book is changed is compared with the date when the "Monthly report" selection button 21 is created (the button created date), as in the above case. If the change support identification number coincides with the user registration identification number and the address book is changed after the created date of the selection button 21, for example, the following two options (1) and (2) are displayed in the display unit 107:

(1) All recipients included in the recipients after the address book is changed (the recipients at the current time, that is, the most recent recipients) are used as the recipients, and (2) No transmission (the transmission is stopped).

In the display of the two options (1) and (2), the display may be performed with one option selected, as in the above case. For example, the display may be performed with (2) No transmission selected. When the display is performed with (2) No transmission selected, wrong transmission is difficult to occur, compared with a case in which the display is performed with the option (1) is selected and a case in which the display is not performed with any option selected.

Although the case in which the two kinds of information: the identification number and the date when the address book is changed are stored is described above, three kinds of information: the identification number, the date when the address book is changed, and the old user name (the user name before the change) may be stored. Alternatively, four kinds of information: the identification number, the date when the address book is changed, the old user name, and the old telephone number may be stored or four kinds of information: the identification number, the date when the address book is changed, the old user name, and the old electronic mail address may be stored. Alternatively, five kinds of information: the identification number, the date when the address book is changed, the old user name, the old telephone number, and the old electronic mail address may be stored.

Although the increase in the number of the kinds of information that are stored increases the amount of use of the memory, a larger amount of information about the user is collected to possibly improve the user friendliness.

An exemplary process when the content of the address book is changed will now be described.

When the content of the address book is changed, it may be determined whether the identification number corresponding to the content to be changed is included in the identification numbers registered when the "Monthly report" selection button 21 is created.

The multiple identification numbers registered when the "Monthly report" selection button 21 is created (the identification information stored in the setting information memory 206) may be searched to determine whether the same identification number as the one corresponding to the content to be changed has already been registered by the processor 202, which is an example of a determining unit.

If the identification number corresponding to the item to be changed is included in the identification numbers registered when the "Monthly report" selection button 21 is created, for example, a message "Item to be changed has already been referred to in "Monthly report" that is set." is displayed on the displayed screen.

If the identification number corresponding to the item to be changed is included the identification numbers registered when the "Monthly report" selection button 21 is created, the following two options (1) and (2) may be displayed on the displayed screen:

(1) Reflect the item to be changed in the "Monthly report", and (2) Do not reflect the item to be changed in the "Monthly report."

When the option (1) is selected by the user, the content of the item, which is part of the address book stored in the address book memory 204 and which the user wants to change, is changed to the content which the user wants. When the option (2) is selected by the user, the change of the address book is not performed.

Also when the above two options are displayed, the display may be performed with one option selected, as in the above case. For example, when a single item is to be changed by the user (for example, the item to be changed by the user is only the recipient (only the facsimile number), the display is performed with the option (1) selected. When multiple items are to be changed by the user (for example, the items to be changed by the user are the identification number and the recipient (the facsimile number), the display is performed with the option (2) selected.

Although the image forming apparatus 10 is described in the above exemplary embodiments, the image forming apparatus 10 includes various functions and may be considered as an apparatus other than the image forming apparatus 10 depending on the combination of functions. For example, an apparatus composed of the image reading unit 108 and the FAX transmitter 203 may be considered as an information transmitting apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information transmitting apparatus comprising:
   a recipient information memory configured to store a plurality of pieces of recipient information concerning recipients of information and recipient identification information that is associated with each of the plurality of pieces of recipient information and that is used for identifying each piece of recipient information;
   a user information memory configured to store user selection identification information, which is the recipient identification information selected by a user from the recipient identification information stored in the recipient information memory, and store a time when the user creates a button with a registered setting, the button executing a function based on the registered setting;
   an information transmitting unit configured to read out the recipient information corresponding to the user selection identification information stored in the user information memory from the recipient information memory in response to the button being pressed, and transmit information to the recipient identified by the recipient information that is read out; and
   a notification unit configured to notify the user of a change in response to the recipient information stored in the recipient information memory being changed after the selection.

2. The information transmitting apparatus according to claim 1, further comprising:
   an option display configured to display at least two options of a first option with which the user is caused to select the recipient before the change and a second option with which the user is caused to select the recipient after the change in response to the recipient information stored in the recipient information memory being changed after the selection.

3. The information transmitting apparatus according to claim 2,
   wherein the option display is configured to display the first option and the second option with the second option selected in the display of the first option and the second option.

4. The information transmitting apparatus according to claim 1,
   wherein the notification unit is configured to not notify the user of the change in response to the recipient identification information associated with the recipient information that is changed being different from the user selection identification information stored in the user information memory even when the recipient information stored in the recipient information memory is changed after the selection.

5. The information transmitting apparatus according to claim 1, further comprising:
   a change information memory configured to store information concerning change each time the recipient information stored in the recipient information memory is changed,
   wherein the notification unit is configured to refer to the change information memory to determine whether the recipient information stored in the recipient information memory is changed after the selection, and
   wherein the change information memory is configured to store only two kinds of information including the recipient identification information associated with the recipient information that is changed and information about a time when the recipient information is changed as the information concerning the change.

6. A non-transitory computer readable medium storing a program causing a computer including a recipient information memory that stores a plurality of pieces of recipient information concerning recipients of information and recipient identification information that is associated with each of the plurality of pieces of recipient information and that is used for identifying each piece of recipient information to execute a process, the process comprising:
   storing user selection identification information, which is the recipient identification information selected by a user from the recipient identification information stored in the recipient information memory, in a memory, and storing a time when the user creates a button that registers a setting in the memory, the button executing a function based on the setting;
   reading out the recipient information corresponding to the user selection identification information stored in the memory from the recipient information memory in response to the button being pressed;
   causing a transmitting unit to transmit information to the recipient identified by the recipient information that is read out; and
   causing a notification unit to notify the user of change in response to the recipient information stored in the recipient information memory being changed after the selection.

7. An information transmitting method comprising:
   storing a plurality of pieces of recipient information concerning recipients of information and recipient identification information that is associated with each of the plurality of pieces of recipient information and that is used for identifying each piece of recipient information;
   storing user selection identification information, which is the recipient identification information selected by a user from the recipient identification information that is stored, and storing a time when the user creates a button with a registered setting, the button executing a function based on the registered setting;
   reading out the recipient information corresponding to the user selection identification information that is stored to transmit information to the recipient identified by the recipient information that is read out in response to the button being pressed; and
   notifying the user of a change in response to the recipient information that is stored being changed after the selection.

* * * * *